United States Patent

Ibamoto et al.

Patent Number: 6,106,434
Date of Patent: Aug. 22, 2000

[54] APPARATUS AND METHOD FOR CONTROLLING GEARSHIFTS IN RESPONSE TO GRADIENT, VEHICLE SPEED AND BUSY SHIFT AREAS OR ENGINE BRAKE AREAS

[75] Inventors: Masahiko Ibamoto, Hitachinaka; Hiroshi Kuroiwa, Hitachi; Toshimichi Minowa, Mito, all of Japan

[73] Assignee: Hitachi, Ltd., Tokyo, Japan

[21] Appl. No.: 09/078,602

[22] Filed: May 14, 1998

[30] Foreign Application Priority Data

May 14, 1997 [JP] Japan ................................. 9-124218

[51] Int. Cl.⁷ .................................................. F16H 59/00
[52] U.S. Cl. ........................... 477/120; 477/118; 477/901
[58] Field of Search .................................. 477/120, 901, 477/115, 118

[56] References Cited

U.S. PATENT DOCUMENTS

| | | | |
|---|---|---|---|
| 4,335,428 | 6/1982 | Miki et al. | 477/120 X |
| 5,241,476 | 8/1993 | Bendford et al. | 477/120 X |
| 5,531,654 | 7/1996 | Ishikawa et al. | 477/120 |
| 5,555,170 | 9/1996 | Nakashima | 477/120 X |
| 5,598,335 | 1/1997 | You | 477/120 X |
| 5,611,748 | 3/1997 | Kashiwabara | 477/901 X |
| 5,655,995 | 8/1997 | Kondo et al. | 477/901 X |
| 5,716,301 | 2/1998 | Wild et al. | 477/901 X |
| 5,806,009 | 9/1998 | Horiguchi | 477/120 X |

FOREIGN PATENT DOCUMENTS

| | | |
|---|---|---|
| 55-140617 | 11/1980 | Japan . |
| 61-15301 | 4/1986 | Japan . |
| 61-48020 | 10/1986 | Japan . |
| 3-9166 | 1/1991 | Japan . |

*Primary Examiner*—Khoi Q. Ta
*Attorney, Agent, or Firm*—Evenson, McKeown, Edwards & Lenahan, P.L.L.C.

[57] ABSTRACT

An automatic transmission control apparatus for a vehicle and a control method thereof keep the optimum vehicle speed even on a road with a gradient such as an up hill or an down hill in line. Whether or not it is necessary to change the gear ratio is determined based on a vehicle speed and the road gradient and for generating a command signal to change the gear ratio if necessary, thereby changing the gear ratio.

4 Claims, 6 Drawing Sheets

APPARATUS AND METHOD FOR CONTROLLING GEARSHIFTS IN RESPONSE TO GRADIENT, VEHICLE SPEED AND BUSY SHIFT AREAS OR ENGINE BRAKE AREAS

BACKGROUND OF THE INVENTION

The present invention relates to an improved automatic transmission control apparatus for a vehicle and control method thereof, in which it is possible to determine gradient of a road and change control characteristic to the characteristic suitable for the road gradient.

The conventional automatic transmission control apparatus for a vehicle is constructed on the assumption that a vehicle runs on a level road. Because the shift control characteristic of the control apparatus of the vehicle on an up hill road is the same as on the level road, the phenomenon called busy shift occurs. It is, therefore, very difficult to drive comfortably the vehicle. Under the condition of the busy shift, the vehicle on the road with a certain gradient is over-accelerated at a third position of a gear. While, the vehicle loses its speed due to the lack of driving force at a fourth position. Therefore, if the vehicle tries to maintain a constant speed, up-shift and down-shift are repeated frequently. Even in such a case, it is possible to run the vehicle at the 3rd position, because the up-shift is not occurred when an accelerator pedal is returned to the extent that the vehicle is not accelerated, by inhibiting the shift to the 4th position. Therefore, in a general vehicle, the busy shift is eliminated by driver's operation of the switch (an over-drive canceling switch) that inhibits the shift to the 4th position or over-drive.

However, in addition that such an operation is burdensome, some drivers do not know when the over-drive switch should be used. As a result, there are some problems such as the deterioration of driving characteristics and the deterioration of the fuel consumption due to frequent shifts.

Therefore, a control apparatus of an automatic transmission which can prevent occurrence of the busy shift has been proposed, for example, in Japanese Patent Publication No. 61-15301 (1986) or Japanese Patent Publication No. 61-48020 (1986).

Because in the proposed method the over-drive is inhibited when the road gradient by which there is the possibility of occurrence of the busy shift is detected by a road gradient detecting sensor or calculated based on an engine load, the over-drive is inhibited in a running state in which the busy shift is not actually occurred. Accordingly, the fuel consumption is deteriorated due to insignificant inhibition of the over-drive.

It is desirable to suppress the vehicle speed with putting the appropriate engine brake on by changing the gear ratio in accordance with the magnitude of the road gradient in a down hill road. In the conventional control apparatus, there is a fear that brake shoes are heated by frequent uses of a foot brake in a drive(D) range state, and finally the foot brake does not work due to the vapor lock of brake oil. To solve such a problem, an improved control apparatus has been proposed in Japanese Patent Laid-Open No.55-140617 (1980) and Japanese Patent Laid-Open No.3-9166 (1991).

However, in such a prior art, the gear range is compulsorily changed to the 2nd range or the 1st range when the road gradient required to put the engine brake on is obtained by a road gradient detecting sensor or from the load of the engine, etc. As a result, the engine speed becomes too high, and thus a noise extremely increases. Further, in the case that the engine speed becomes too low, the range in which the fuel is cut off becomes narrow and thus the fuel consumption is deteriorated.

SUMMARY OF THE INVENTION

An object of the present invention is to provide an improved automatic transmission control apparatus for a vehicle and control method thereof, in which it is possible to keep the optimum vehicle speed even on a road with gradient such as an up hill or an down hill.

Another object of the present invention is to provide an improved automatic transmission control apparatus for a vehicle and control method thereof, in which it is possible to improve the fuel consumption on a road with gradient such as an up hill or an down hill.

In order to attain the above objects, the present invention is configured as follows.

According to one aspect of the present invention, an automatic transmission control apparatus for a vehicle having an engine and an automatic transmission for shifting an output of the engine and transmitting the shifted output to drive wheels comprises: a gear ratio calculating means for calculating the gear ratio of the automatic transmission, a road gradient calculating means for calculating the gradient of a road, a gear-ratio-change-command generating means for determining whether or not it is necessary to change the gear ratio based on a vehicle speed and the road gradient and for generating a command signal to change the gear ratio if necessary, a shift control means for changing the gear ratio based on the command signal provided from the gear-ratio-change-command generating means.

Preferably, the gear-ratio-change-command generating means determines whether or not it is necessary to change the gear ratio based on the data representing the pre-stored busy shift area.

Further, the gear-ratio-change-command generating means can determine whether or not it is necessary to change the gear ratio based on the data representing a shift line diagram of the pre-stored engine brake area.

Preferably, the road gradient calculating means calculates the gradient of a road based on an output signal provided from a road gradient detecting sensor.

Further, the road gradient calculating means can calculate the gradient of a road based on driving torque and a vehicle speed.

According to another aspect of the present invention, an automatic transmission control method for a vehicle having an engine and an automatic transmission for shifting an output of the engine and transmitting the shifted output to drive wheels comprises the steps of: calculating the gear ratio of the automatic transmission, calculating the gradient of a road, determining whether or not it is necessary to change the gear ratio based on a vehicle speed and the road gradient and for generating a command signal to change the gear ratio if necessary, changing the gear ratio based on the command signal.

DESCRIPTION OF THE PREFERRED EMBODIMENTS

Embodiments of a control apparatus of an automatic transmission for an automobile will be explained with reference to the attached drawings.

Figure 1:
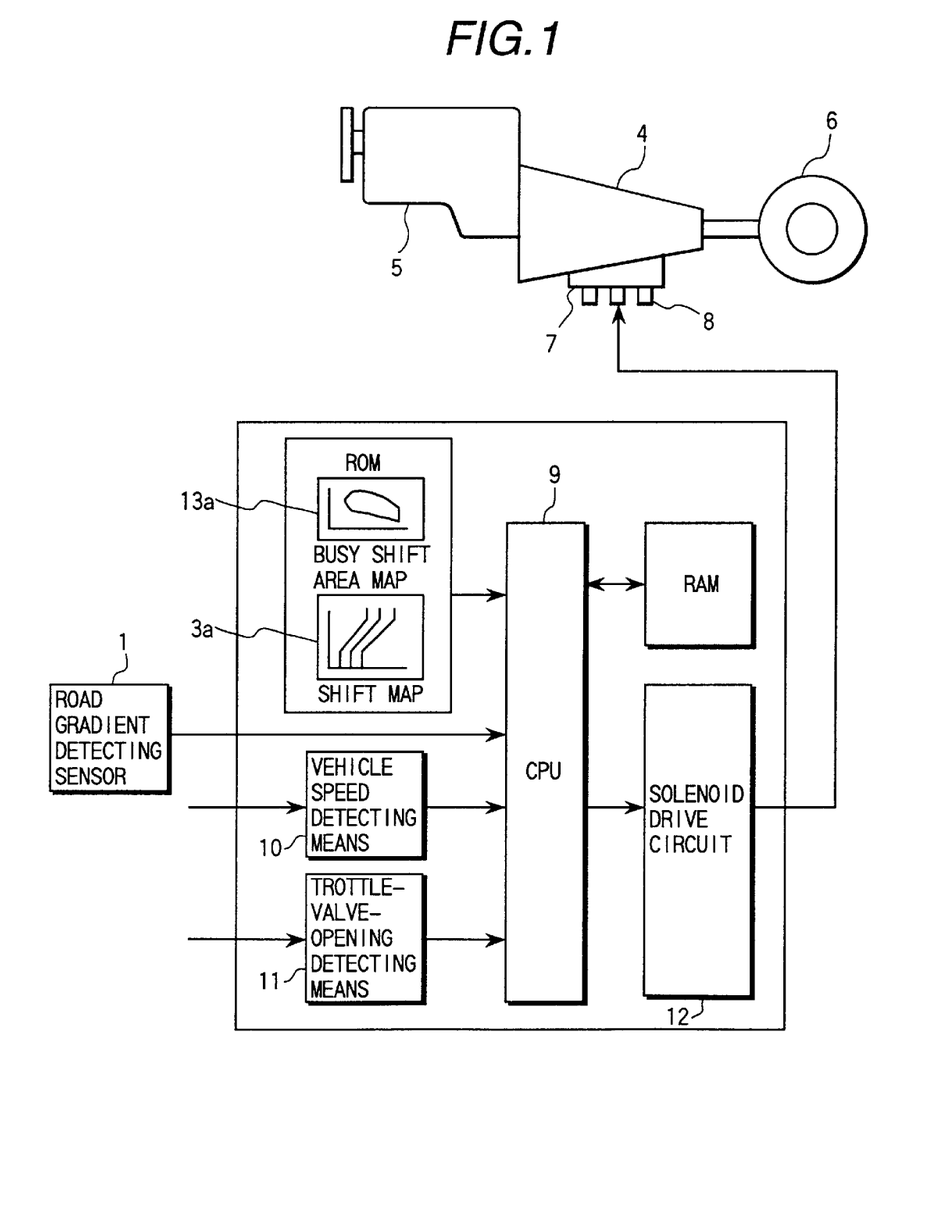
FIG. 1 is a construction view of a control apparatus of an automatic transmission according to a first embodiment of the present invention.

FIG. 1 shows the whole construction of a control apparatus of an automatic transmission, including a road gradient detecting sensor. In the control apparatus, a shift line read out from a shift map 3 in a shift control device 2 is changed according to an output signal of a road gradient detecting sensor 1 for detecting a physical slope angle of the automobile. An automatic transmission 4 of the automobile shifts an output of an engine 5 and transfers a driving force to tires 6, in which a clutch (not shown) in the automatic transmission 4 is switched over by operating a solenoid valve 8 provided in a oil pressure circuit 7, and thus the vehicle speed is changed.

The shift control device 2 comprises a microcomputer. A central processor unit (CPU) 9 inputs a vehicle speed detected by a vehicle speed detecting means 10 and throttle valve opening detected by a throttle-valve-opening detecting means 11, reads out the gear ratio corresponding to the detected vehicle speed and the detected throttle valve opening from the shift map 3 stored in the ROM, and obtains the gear ratio suitable for the detected vehicle speed. The shift control device 2 further supplies a current from a solenoid drive circuit 12 to a solenoid valve according to the obtained gear ratio. As a result, the clutch is switched over and thus the gear ratio is changed. Namely, the shift map 3 acts as a gear ratio calculating means, and the solenoid drive circuit 12 acts as an output interface of the shift control device. A random access memory (RAM) is used temporarily as a memory to calculate in the course of the above control operation.

The road gradient detecting sensor 1 is used to detect the inclination angle of a vehicle with respect to the horizontal line. In order to detect the inclination angle, it is effect to use a gyroscope which indicates an absolute direction, or a plumb or a level which indicates vertical and horizontal directions. The inclination angle output from the gradient detecting sensor 1 is input to the CPU 9, in which the gradient of a road is calculated. In the CPU 9, the gear ratio read out from the shift map 3 is changed by the road gradient obtained in the above manner. As a result, a shift control characteristic which provides easy drive is obtained.

Figure 2:
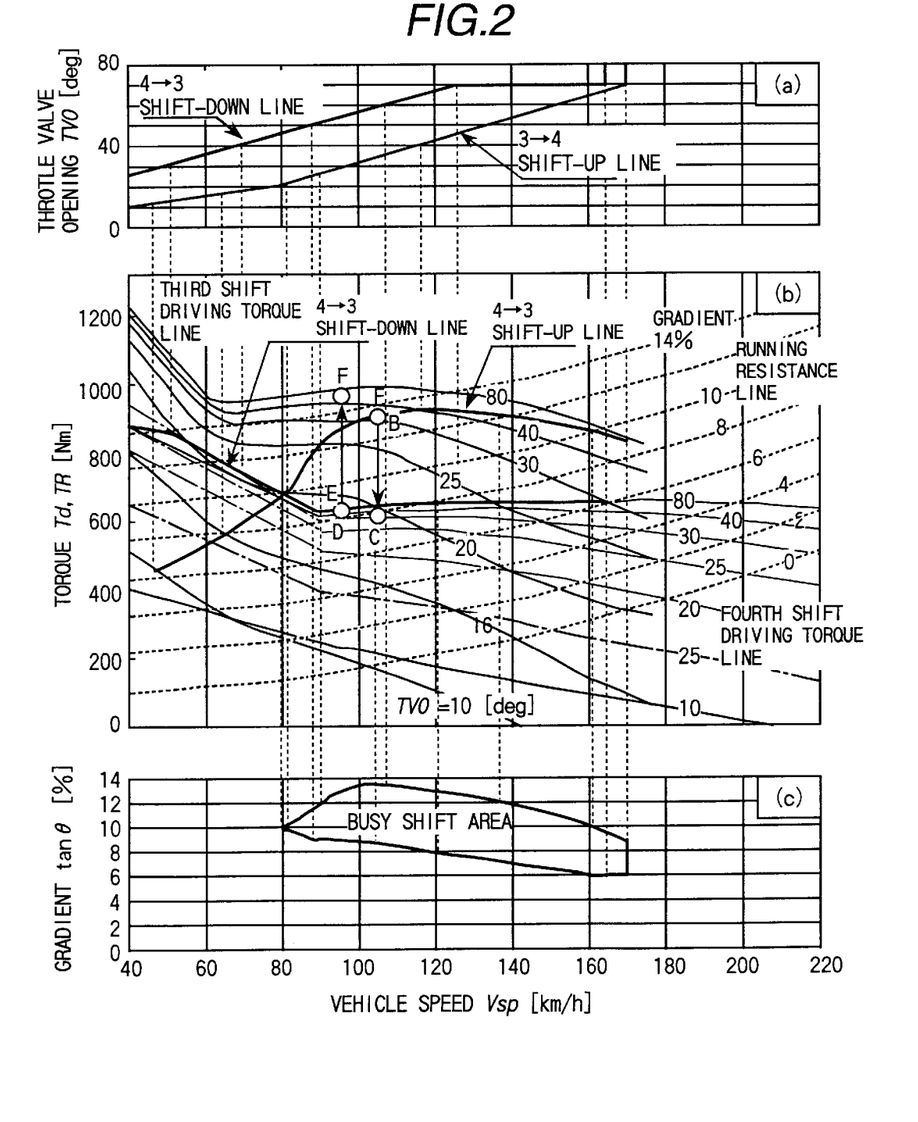
FIG. 2 is a characteristic view showing a busy shift area of the control apparatus of the automatic transmission according to the first embodiment of the present invention.

FIG. 2 shows the improved shift control characteristic called a busy shift. A top portion (a) of FIG. 2 shows the shift line between a third position and a forth position which are stored in the shift map 3. A middle portion (b) of FIG. 2 shows driving force of the 3rd position and the 4th position of the same vehicle. The shift line drawn by thick lines is obtained by transferring the shift line of the top portion of FIG. 2 into the middle portion of FIG. 2. As a result, it become possible to read the torque generated when the vehicle speed is changed, and thus the range in which the busy shift is occurred is determined from the relationship between the torque before and after the change-speed and the running resistance.

For example, when the vehicle runs on a uphill road with 10% gradient at a constant speed of 100 km/h, the vehicle speed exceeds 100 km/h in the case that the vehicle is accelerated at throttle valve opening of 40°. Therefore, if the accelerator is returned at an A point, the operating point passes over the shift line at a B point and thus the shift-up is performed. While the operating point shifts to a C point when the 4th position is obtained, the vehicle is decelerated because of the lack of torque and thus the operating point is directed to a D point. Therefore, the accelerator is naturally stepped down. As a result, the gear is changed down to the 3rd position again at an E point, and thus the operating point is returned to an F point and the vehicle is accelerated. The above operation is repeated. If the throttle valve opening is at 22° at the 3rd position, the equilibrium is obtained at 10% gradient. However, it is impossible to realize the equilibrium in this shift line, because the shift-up is performed before the vehicle speed reached 90 km/h when the throttle valve opening is at 22°.

Namely, in the area between an up-line and an down-line and between 82 km/h and 161 km/h in FIG. 2, it is impossible to provide an equilibrium state in which the 3rd driving torque line and the running resistance line are intersected with each other. The area of busy shift shown in a bottom portion (c) of FIG. 2 is obtained by cutting out the range of the vehicle speed where the busy shift may occur in every gradient. In order to avoid the busy shift, it is necessary to shift the shift line from 3rd to 4th to a high-speed side when the operating point approaches the above range, or eliminate the range by inhibiting the change-speed.

Figure 3:
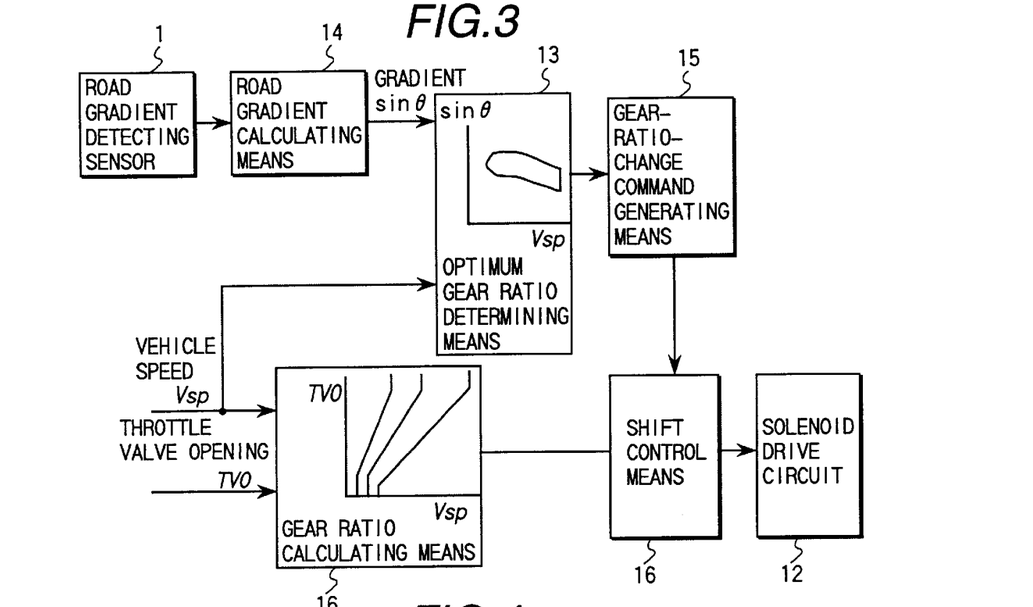
FIG. 3 is a control block diagram of the control apparatus of the automatic transmission shown in FIG. 1.

Therefore, as shown in FIG. 3, a map 13 of the busy shift area is provided in the ROM of the shift control device 2. It is determined whether or not the operation point falls within the busy shift area by using the vehicle speed and the road gradient. If it is determined that the busy shift may occur, the gear ratio is changed.

The busy shift area is determined by the shift line and the driving force characteristic, which is determined by the engine characteristic and the torque converter characteristic. Therefore, the busy shift area is uniquely determined by a car itself. It is, therefore, possible to store the pre-calculated area of busy shift into the ROM. A road gradient calculating means 14 calculates road gradient using an output signal of the road gradient detecting sensor 1, and determines whether or not the operation point falls within the busy shift area by providing the vehicle speed and the road gradient to the busy shift area map 13. Because the gear ratio is not in the optimum state if it falls within the busy shift area, a gear-ratio-change-command generating means 15 generates the gear-ratio-change-command in such a case. A shift control means 16 changes the normal gear ratio read out from the shift map 3 upon the reception of the gear-ratio-change-command, and enables a solenoid drive circuit to operate.

While in the prior art the busy shift area is determined only by the road gradient and the busy shift eliminating control is performed, it become possible to perform the busy shift eliminating control by discriminating the area in more detail, because the busy shift area is determined as a function of the vehicle speed and the road gradient in this embodiment.

For example, referring to an example shown in the bottom portion of FIG. 2, while in the prior art the busy shift eliminating control is performed uniformly in the case that the road gradient is over 6%, in this embodiment the busy shift eliminating control is performed over 8% at 100 km/h and the up-shift is allowed between 6% and 8% at 100 km/h. It is, therefore, possible to drive with good feeling and improved fuel consumption.

Figure 4:
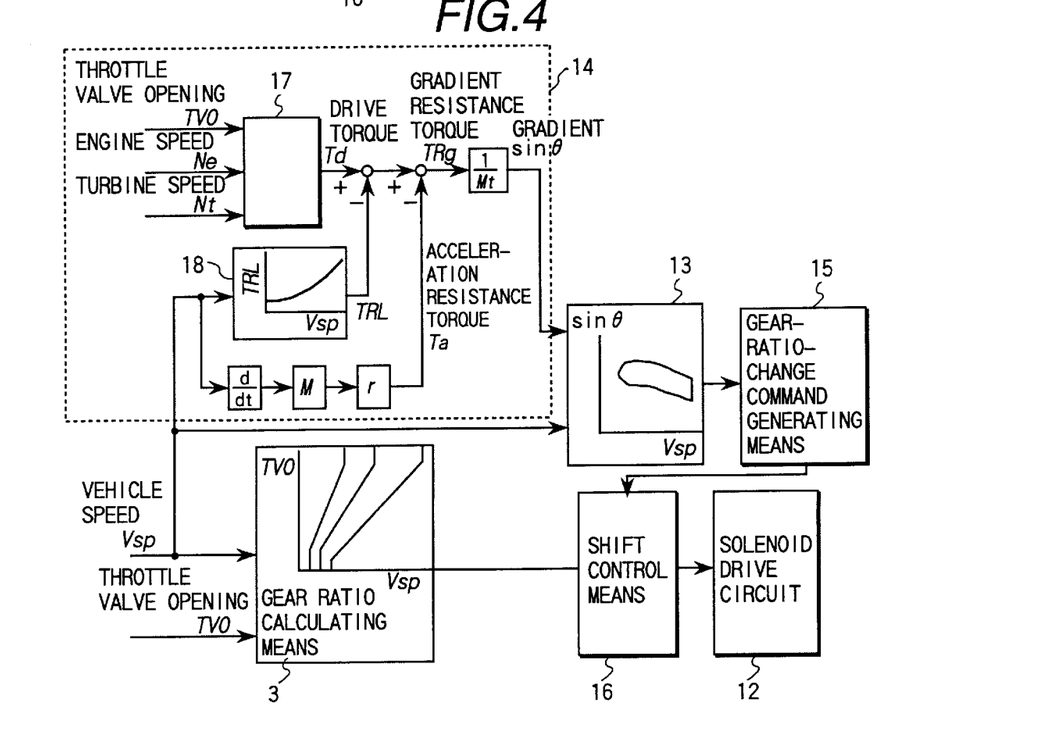
FIG. 4 is a control block diagram of a control apparatus of the automatic transmission according to a second embodiment of the present invention.

FIG. 4 is a control block diagram of a control apparatus of the automatic transmission according to a second embodiment of the present invention. While the configuration of the shift control device 2 is similar to that of FIG. 3, an inclination angle detecting sensor is not used to detect the road gradient in this embodiment. Namely, the road gradient itself is not detected and is obtained by the calculation from the driving torque. Because how to calculate the driving torque in a drive torque calculating means 17 is disclosed in Japanese Patent Application Laid-Open No. 6-317242 (1994), assigned to the same applicants, the detailed description is abbreviated herein. Briefly speaking, the driving torque is calculated from signals of an engine speed Ne, an input rotational frequency Nt of the transmission (a turbine speed of the torque converter), the throttle valve opening TVO and so on. A characteristic map 18 of the running resistance for a flat road is pre-stored in the ROM. The running resistance TRL for the flat road is read out according to the vehicle speed and it is subtracted from the driving torque.

Further, acceleration a is obtained by differentiating the vehicle speed, and the acceleration resistance torque Ta is obtained by multiplying the acceleration a by vehicle weight M and radius r of a tire. As shown in FIG. 4, gradient resistance torque TRg is obtained by subtracting the acceleration resistance torque Ta from the result previously obtained. Therefore, the road gradient can be obtained by dividing the gradient resistance torque TRg by the vehicle weight M and the tire radius r. Such a road gradient calculating means is disclosed in Japanese Patent Application Laid-Open No. 6-074320 (1994), assigned to the same applicants. Like this, the vehicle speed and the road gradient calculated without using the road gradient detecting sensor are provided to the busy shift area map 13. If it is determined that the operation point falls within the busy shift area, then the gear-ratio-change-command generating means 15 provides the gear-ratio-change-command signal to the shift control means 16. The shift control means 16 changes the gear ratio read out from the shift map 3 and provides it to the solenoid drive circuit 12.

Because according to this embodiment it is possible to perform the busy shift eliminating control without using the road gradient detecting sensor, it becomes possible to realize the control apparatus at lower cost.

Figure 5:
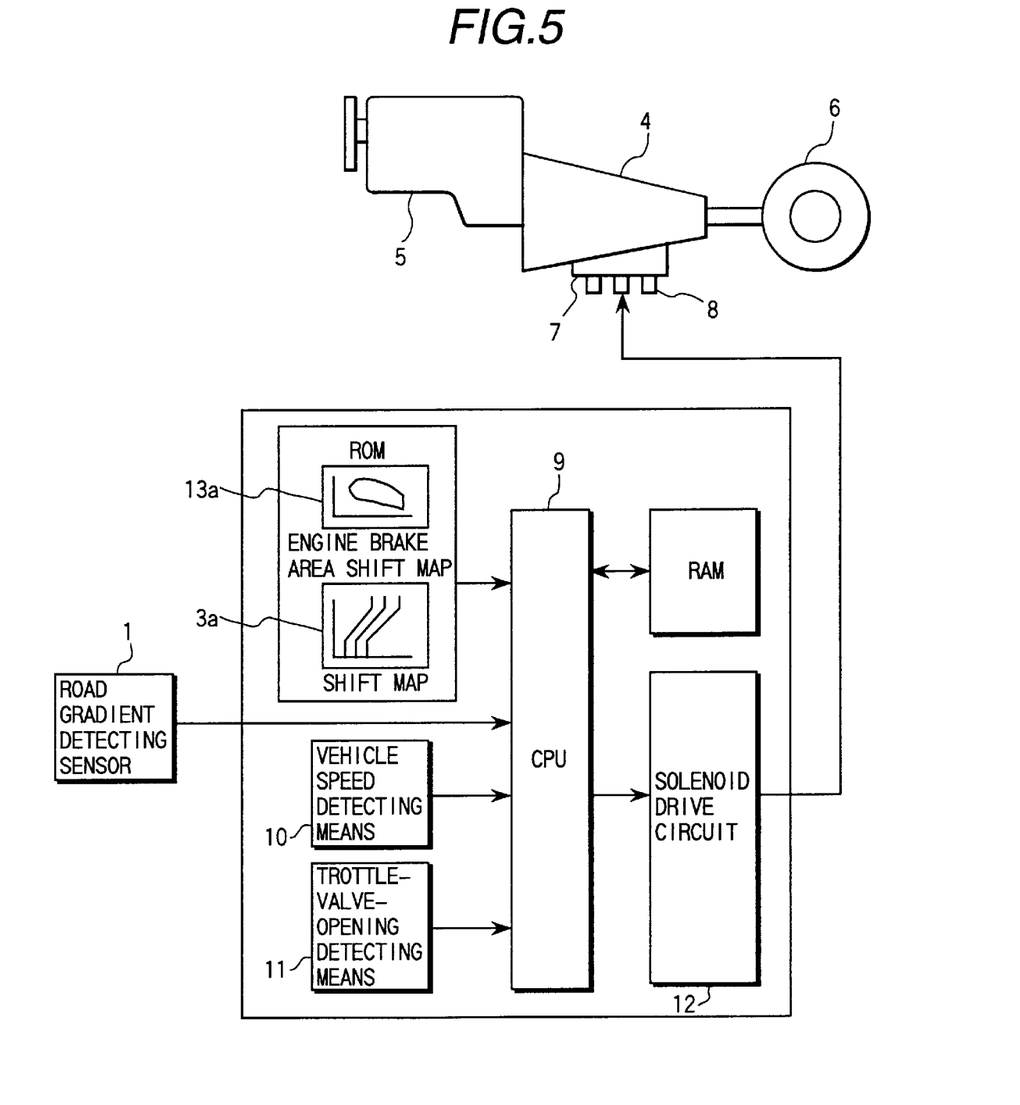
FIG. 5 is a construction view of a control apparatus of the automatic transmission according to a third embodiment of the present invention.
Figure 7:
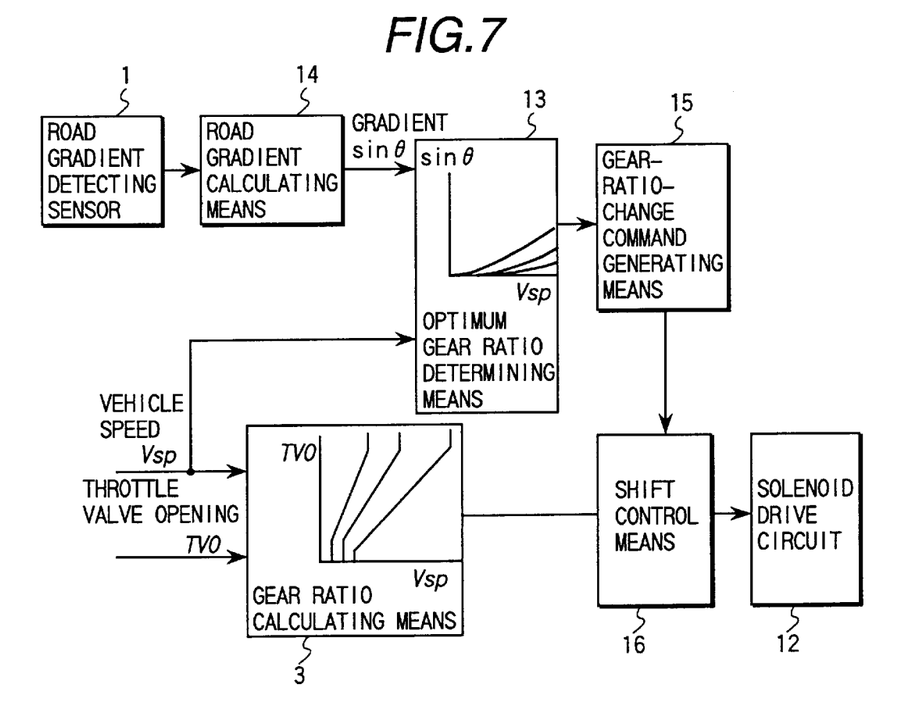
FIG. 7 is a control block diagram of the control apparatus of the automatic transmission shown in FIG. 5.

FIG. 5 shows a control apparatus of the automatic transmission according to a third embodiment of the present invention, and FIG. 7 shows a control block of the control apparatus of the automatic transmission shown in FIG. 5. There is the difference in configuration from the embodiment of FIGS. 1 and 3 in that a shift line diagram 19a for an engine brake area is provided instead of the busy shift area map 13.

Figure 6:
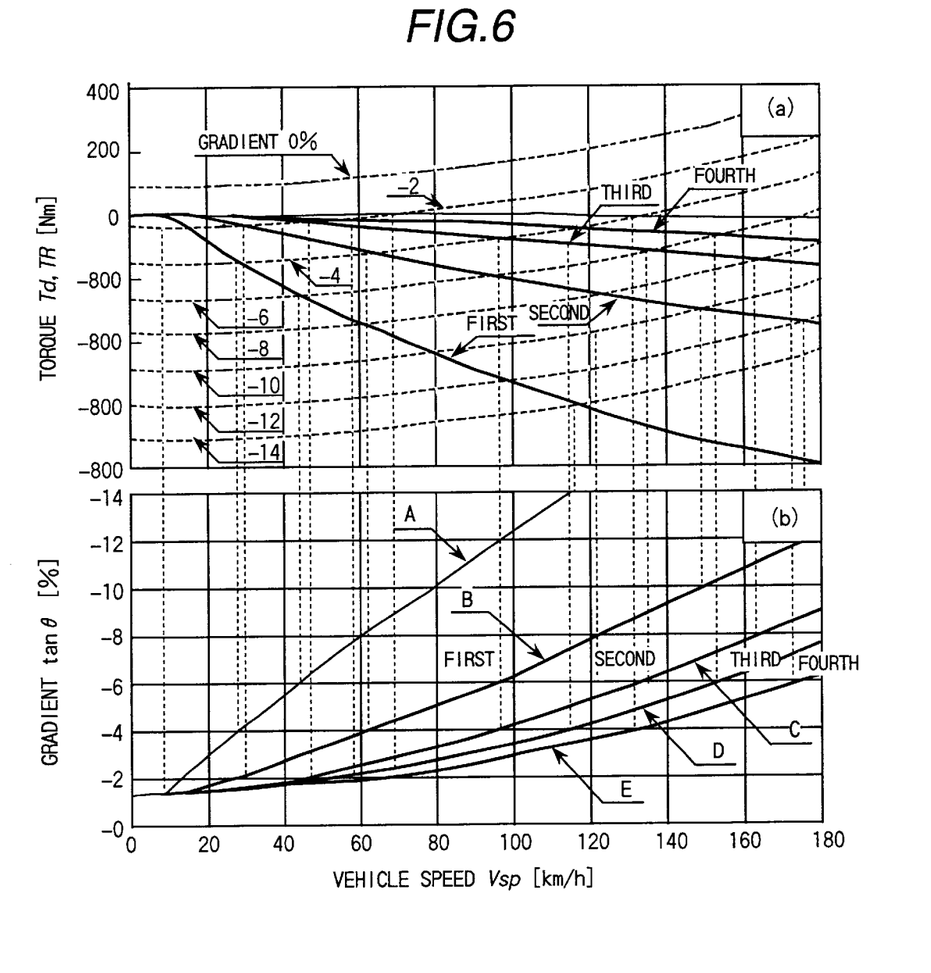
FIG. 6 is a characteristic view showing an engine brake area of the control apparatus of the automatic transmission according to the third embodiment of the present invention.

In a downhill road, the engine brake works at a fully closed state of the throttle valve opening. The braking force is different according to a state of the moment as shown in a top portion (a) of FIG. 6. An intersecting point with the running resistance curve in each gradient shows an equilibrium point. It is possible to run on the downhill road at a vehicle speed of the equilibrium point. The bottom portion (b) of FIG. 6 illustrates the equilibrium point by using the relationship between the vehicle speed and the road gradient. In the bottom portion of FIG. 6, an A line indicates the vehicle speeds which balance with the road gradients under the condition of the engine brake due to the 1st position, and an B line indicates the vehicle speeds which balance with the road gradients under the condition of the engine brake due to the 2nd position The upper left area with respect to the A line is the area where the equilibrium state is not realized unless a foot brake is used. The area between the A line and the B line is the area where the equilibrium state is realized if the throttle valve is opened by a little under the condition of the 1st position. In like manner, a C line and a D line indicate the vehicle speeds which balance with the road gradients under the condition of the engine brake due to the 3rd position and the 4th position, respectively. The area between the C line and the D line is the area where the equilibrium state is realized if the throttle valve opening is adjusted. An E line indicates the vehicle speeds which balance with the road gradients under the condition in which the engine brake is not put on, that is, under the condition of existence just of aerodynamic drag and rolling friction. The lower right area with respect to the E line is the area where the equilibrium state is not realized unless positive driving torque is provided. The area between respective lines, for example, the area between the lines C and D is the area possible to control not only by the 3rd position but also by the 1st or the 2nd position if the throttle valve opening is adjusted.

It is, however, preferable that the engine brake is put on at the 3rd position, because the engine speed becomes too high at the 1st position. Therefore, it is possible to put the engine brake on at the optimum gear ratio by storing the content of the bottom view of FIG. 6 as the shift line diagram 19a of the engine brake area. According to this embodiment, there is no case that too high engine speed provides a driver uncomfortable feeling, and that too low engine speed limits a fuel cut area. It is, therefore, possible to drive with good feeling and with improved fuel consumption.

While three preferred embodiment of the invention has been described, such description is for illustrative purposes only, and it is to be distinctly understood that the invention is not limited thereto, and that changes and variations may be made without departing from the spirit or scope of the following claims. For example, while the road gradient is detected by a sensor in the third embodiment, it should be appreciated that the road gradient of the third embodiment is also obtained by the calculation in a manner similar to that of the second embodiment.

Further, while, for simplification, only the busy shift eliminating control has been described in the first and the second embodiments, and only the engine brake control has been described in the third embodiment, it should be appreciated that for all practical purposes both of the busy shift control and the engine brake control may be provided.

As clearly seen from the above description, the automatic transmission control apparatus for a vehicle and control method thereof of the present invention can select the optimum gear ration by using the vehicle speed and the road gradient. It is, therefore, possible to eliminate the busy shift and put the engine brake on at the optimum gear ratio. As a result, it is possible to improve drive feeling and fuel consumption.

What is claimed is:

1. An automatic transmission control apparatus for a vehicle having an engine and an automatic transmission for shifting an output of the engine and transmitting the shifted output to drive wheels, comprising:

- a gear ratio calculator for calculating the gear ratio of the automatic transmission,
- a road gradient calculator for calculating a road gradient,
- a gear-ratio-change-command generator for determining whether it is necessary to change the gear ratio based on vehicle speed and the road gradient and for selectively generating a command signal to change the gear ratio, and
- a shift controller for changing the gear ratio based on the command signal provided from said gear-ratio-change-command generator, wherein said gear-ratio-change-command generator is configured to determine whether the gear ratio is to be changed based on data representing a pre-stored busy shift area.

2. An automatic transmission control apparatus for a vehicle having an engine and an automatic transmission for shifting an output of the engine and transmitting the shifted output to drive wheels, comprising:

- a gear ratio calculator for calculating the gear ratio of the automatic transmission,
- a road gradient calculator for calculating a road gradient,
- a gear-ratio-change-command generator for determining whether it is necessary to chance the gear ratio based on vehicle speed and the road gradient and for selectively generating a command signal to change the gear ratio, and
- a shift controller for changing the gear ratio based on the command signal provided from said gear-ratio-change-command generator, wherein said gear-ratio-change-command generator is configured to determine whether the gear ratio is to be changed based on data representing a shift line diagram of a pre-stored engine brake area.

3. An automatic transmission control method for a vehicle having an engine and an automatic transmission for shifting an output of the engine and transmitting the shifted output to drive wheels, comprising the steps of:

(a) calculating a gear ratio of the automatic transmission,
   (b) calculating a road gradient,
   (c) determining the necessity to chance the gear ratio based on vehicle speed and the road gradient and for selectively generating a command signal to change the gear ratio, and
   (d) changing the gear ratio based on the command signal, wherein step (c) is based on data representing pre-stored busy shift area.

4. An automatic transmission control method for a vehicle having an engine and an automatic transmission for shifting an output of the engine and transmitting the shifted output to drive wheels, comprising the steps of:

(a) calculating a gear ratio of the automatic transmission,
   (b) calculating a road gradient,
   (c) determining the necessity to change the gear ratio based on vehicle speed and the road gradient and for selectively generating a command signal to change the gear ratio, and
   (d) changing the gear ratio based on the command signal, wherein step (c) is based on data representing a shift line diagram of pre-stored engine brake area.

* * * * *